United States Patent Office 2,964,383
Patented Dec. 13, 1960

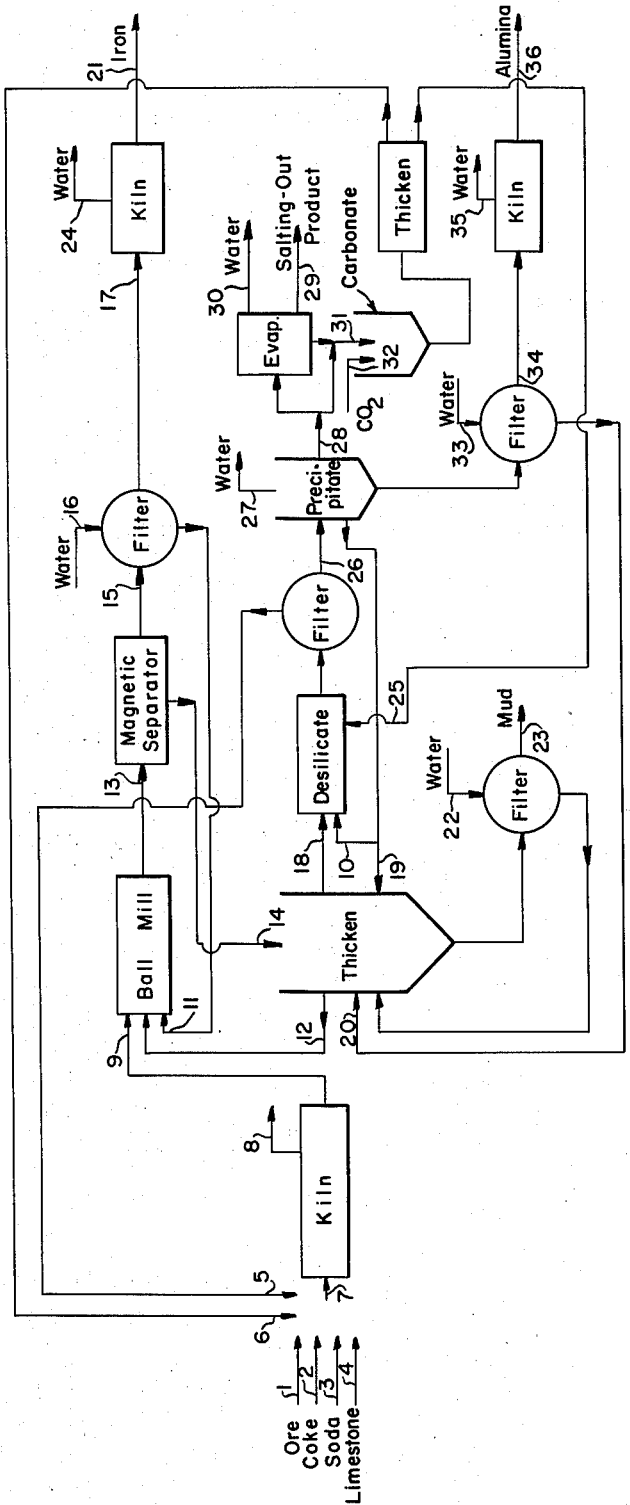

2,964,383
PROCESSING OF FERRUGINOUS ALUMINUM ORES

Jonas Kamlet, New York, N.Y., assignor to Reynolds Metals Company, Richmond, Va., a corporation of Delaware Filed Sept. 5, 1958, Ser. No. 759,289

21 Claims. (Cl. 23—143)

This invention relates to the processing of ferruginous aluminum ores. More particularly, this invention relates to a process whereby ferruginous aluminum ores may be treated for the recovery of values, such as aluminum oxide and metallic iron concentrates. It has for its purpose to provide a method whereby ferruginous aluminum ores, which have previously been unsuitable for processing by any of the procedures heretofore known to the art, may be used economically as raw materials for the manufacture of alumina and metallic iron concentrates.

There are available throughout the world large deposits of aluminiferous minerals, ores and earths which are relatively high in iron oxides content and are therefore largely unsuitable for processing by any of the present "alkaline" or "acid" processes. In the so-called "alkaline" processes, in which the ore is calcined with limestone and/or soda ash to solubilize the alumina (as sodium aluminate) and to insolubilize the silica (as dicalcium silicate), the presence of a high iron oxides content in the ore involves an irretrievable loss of the limestone and/or soda ash reagents. These will react with the iron oxides at the temperature of the calcination to form sodium and calcium ferrites and ferrates from which the alkali cannot conveniently be recovered and which have little or no commercial value as such. In the so-called "acid" processes, in which the alumina in the ore is solubilized by leaching with aqueous acid solutions, the presence of a high iron oxides content is highly deleterious. Not only do the iron oxides consume large quantities of the acid (from which the original reagent is difficult and expensive to recover) but the presence of iron salts in the aluminum salt solution renders the recovery of a low-iron alumina (such as is required in the electrolytic aluminum process) highly complicated, expensive and commercially impractical.

The purpose of this invention is to provide a process whereby such aluminiferous ores, minerals and earths, high in iron oxides content, may conveniently and economically be processed for the recovery of sodium aluminate solutions (from which aluminum hydroxide and alumina may be obtained by the well known processes of the prior art) and a high metallic iron concentrate, suitable for use in the manufacture of steel, ferro-alloys, in powder metallurgy and, in fact, wherever such metallic iron concentrates are at present employed.

Such ferruginous aluminum ores are found in considerable deposits on Kauai in the Hawaiian Islands, in Oregon, Washington, Arkansas, in Jamaica and British Guiana, in Costa Rica, France, Italy, Yugoslavia, Indonesia and elsewhere throughout the world. While many high iron oxide bauxites may be utilized in the Bayer process, the presence of large quantities of iron oxides in the ore makes their use considerably less attractive commercially since this represents an inert burden which must be handled, processed and ultimately discarded in the red mud. In addition, most of these high iron oxide bauxites contain less than 32% of recoverable alumina by the Bayer process (as calculated by subtracting 1.1 times the silica content from the alumina content) which is considered necessary for the economic recovery of alumina from such ores.

The process of the present invention is applicable to all aluminiferous minerals, ores, slags and earths containing considerable amounts of iron oxides (e.g. as hematite, magnetite, limonite, geothite, siderite). Such minerals and ores may be largely bauxite, gibbsite, boehmite, diaspore, corundum, laterite, terra rossa, lithomarge, bauxitic earths and clays, diasporic earths and clays, et cetera.

A typical ore which is suitable for processing by the procedure of the present invention is a bauxitic earth available on Kauai, in the Hawaiian Islands. This ore, as mined and without further beneficiation, contains from 28% to 36% of $Al_2O_3$, from 29% to 43% of iron oxides (largely as $Fe_2O_3$), from 1.6% to 27.0% of $SiO_2$, from 3.5% to 7.0% of $TiO_2$ and will lose from 12% to 24% by weight on ignition. This ore is completely unsuitable for processing without prior beneficiation and upgrading by any of the present "acid" or "alkaline" processes (including the Bayer and the "combination" process). It is, however, ideally suited for processing by the process of my present invention, directly as mined and without further beneficiation and upgrading.

The basis of my invention is the finding that such aluminiferous minerals and ores, high in iron oxide content, can conveniently and economically be processed by the sequence of steps which comprises:

(a) Admixing said raw materials with sodium carbonate in quantity at least sufficient to combine with the alumina contained therein, with calcium carbonate in quantity at least sufficient to combine with the silica contained therein and with a carbon-containing material in quantity at least sufficient to reduce a substantial portion of the iron oxides contained therein to metallic iron, and thereafter calcining said mixture in a reducing atmosphere within a temperature range sufficient to effect formation of sodium aluminate, calcium silicate and metallic iron, (b) Thereafter comminuting said calcine and separating the metallic iron content thereof by magnetic separation, and (c) Thereafter leaching the residue of said iron extraction with an aqueous solution to effect the solution of the sodium aluminate contained therein and separating the sodium aluminate solution from the insoluble residue containing the calcium silicate.

In this manner, the undesirable presence of a high iron oxide content in such minerals and ores may be converted to a distinct economic advantage. By reduction of the iron oxides to metallic iron simultaneously with the formation of the sodium aluminate and calcium silicate, a valuable co-product of metallic iron is obtained together with the aluminate values. In addition, the tendency of the iron oxides to combine and react with the soda ash and the calcium carbonate in the calcine feed mix, thereby causing an irretrievable loss of these valuable reagents, is largely obviated. It therefore becomes feasible for the first time economically to recovery alumina from ores high in iron oxides content, even if such ores are otherwise unsuitable for processing by the Bayer or the "combination" processes.

Numerous processes have been proposed (and in some cases operated in various parts of the world) for the processing of ferruginous aluminum ores. Thus, Pedersen (U.S. Patent 1,618,105, 1927) describes a process wherein a ferruginous aluminum ore (or a mixture of bauxite and iron ore) is smelted in an electric furnace with coke and limestone, to obtain a low-sulfur pig iron and a slag containing calcium aluminate, from which sodium aluminate is recovered by leaching with a soda ash solution. This process is industrially feasible only in areas where electric power is inexpensively available. Calcium aluminate slags and pig iron of the type obtained by the Pedersen process have also been produced in a blast furnace smelting process by Joseph, Kinney and Wood, of the U.S. Bureau of Mines (Amer. Inst. Mining Met. Eng., Techn. Publ. 112, 1928). This process is commercially feasible only in areas where coke is freely and inexpensively available. Neither of these processes is economically practical at sites where neither electric power nor coke, as a primary fuel, is available as, for instance, in the Hawaiian Islands where large deposits of ferruginous aluminum ores are to be found.

The novelty of the process of my invention resides in (a) the reduction of the iron oxides in the aluminum ore at a temperature below the fusion point of metallic iron, so that the iron concentrate is recovered in a powdered or granular form, rather than in a molten form, and (b) the simultaneous formation of sodium aluminate and dicalcium silicate by the use of a mixture of soda ash and calcium carbonate in the calcine charge. This obviates the separate steps of the Pedersen process involved in comminuting and leaching the calcium aluminate slag with a soda ash solution. It is impractical to use a mixture of soda ash and calcium carbonate (limestone) in the Pedersen electric furnace process, or in the related blast-furnace process, inasmuch as the temperatures involved are as high as 1650°–1700° C., and the volatilization of the soda ash at these temperatures is excessive. The process of my invention operates within temperature ranges where losses of soda ash by volatilization are negligible.

The basis of my invention may best be understood by a seriatim description of the individual steps thereof.

The furnace charge is prepared by intimately mixing the ferruginous aluminum ore, sodium carbonate, calcium carbonate and a carbon-containing material.

The sodium carbonate may be added in the form of soda ash or a hydrated sodium carbonate. However, since the process of this invention is most economically operated as a cyclic process in which the sodium carbonate is recovered in each cycle by the carbonation of a sodium aluminate solution, the preferred method for preparing the furnace charge is with an aqueous solution containing sodium carbonate recycled from the subsequent carbonation of a sodium aluminate solution. The quantity of sodium carbonate in the furnace charge is proportioned so as to provide from 1.00 to 1.15 moles of $Na_2CO_3$ for each 1.00 mole of $Al_2O_3$ in the aluminous ore charged. The effect on alumina and metallic iron yields of varying amounts of sodium carbonate added to the furnace charge will be described in the examples given below.

The calcium carbonate added to the furnace charge is preferably in the form of limestone. However, calcium carbonate may also be added in the form of marble, chalk, chemical byproduct calcium carbonate (as e.g. the residue from the lime causticizing of soda ash) or, in fact, any form of calcium carbonate. When using a calcium carbonate mineral (e.g. limestone), it is important to employ quantities calculated on the basis of "effective $CaCO_3$ content." This is calculated by deducting from the total $CaCO_3$ two moles of $CaCO_3$ for each mole of $SiO_2$ present. Thus, a limestone analyzing 97.8% $CaCO_3$ and 1.2% of $SiO_2$ has an "effective $CaCO_3$ content" of 93.8%.

The total effective $CaCO_3$ added to the furnace charged must take into account the total silica added to the charge with the ferruginous aluminum ore and with the carbon-containing material which is added to reduce the iron oxide. In addition, since most ferruginous aluminum ores also contain titanium dioxide, it is necessary to add sufficient $CaCO_3$ to react with the $TiO_2$ present to form calcium titanate-$CaTiO_3$. The quantity of calcium carbonate (effective) in the furnace charge is proportioned so as to provide:

(a) From 2.00 to 2.15 moles of $CaCO_3$ for each mole of total $SiO_2$ in the furnace charge, plus (b) 1.00 mole of $CaCO_3$ for each mole of $TiO_2$ in the furnace charge.

The effect on alumina and metallic iron yields of varying amounts of $CaCO_3$ added to the furnace charge will be described in the examples given below.

The carbon-containing material added to the furnace charge as a reducing agent for the iron oxides content of the aluminum ore may vary considerably in nature and composition. Thus, it may be largely carbon in composition, such as coke, coke breeze, bituminous or anthracite coal, coal dust, coal fines, lignite, peat, charcoal, coal tar, coal tar pitch, wood tar, pitch, et cetera. The carbon-containing material may be hydrocarbon in nature, such as petroleum, petroleum fractions, fuel oil, mineral oil, petroleum wax, bitumen, petroleum pitch, petroleum coke, et cetera. The carbon-containing material may also be carbohydrate in nature, such as bagasse residues from sugarcane, wood, wood flour, wood waste, wood processing byproducts, molasses, starch residues and wastes, agricultural cellulosic and hemi-cellulosic by-products, residues and wastes, et cetera.

The carbon-containing material is added to the furnace charge in an amount at least stoichiometrically sufficient to reduce a substantial part of the iron oxides in the furnace charge to metallic iron. However, for optimum yields in the recovery of metallic iron, the carbon-containing material is usually added in amounts in excess of the stoichiometric requirements. The amount of carbon-containing material added may vary quite widely, depending on the nature and composition of said material. In the examples described below, the amounts of representative carbon-containing materials added to the furnace charge will be discussed.

The charge thus prepared is introduced into the furnace as a dry feed, as a semi-dry or moist feed or in the form of a wet slurry. The furnace may be of any convenient form and design as, e.g. a muffle furnace, reverberatory furnace, etc. However, the preferred furnace is a rotary kiln, fired with gas, powdered coal or coke or with a petroleum fraction such as fuel oil. The rotary kiln is best fired in a reducing atmosphere. The optimum temperature range and the duration of residence within the furnace will be discussed in the examples given below.

The sintered product from the furnace or the rotary kiln is then cooled and is ground (as, for instance, in ball mills) prior to magnetic separation of the metallic iron formed during the reduction in the furnacing of the charge. The ground sinter may be extracted in the dry form. However, it is most conveniently processed by mixing the sintered product with water, or an aqueous solution of sodium aluminate (such as recycle $NaAlO_2$ liquor from the subsequent leaching of the magnetic-extracted sintered product).

The dry or wet slurry of comminuted sinter product is then magnetically extracted by any of the well-known magnetic separation processes of the prior art. This may be effected with magnetic cyclone separators, Davis-tube magnetic separators or, in fact, any method at present employed for the separation of magnetic from non-magnetic materials.

The magnetically separated fraction is washed with water and dried by conventional means to yield the metallic iron concentrate, which is the co-product of this process.

The residue from the magnetic iron extraction (consisting of sodium aluminate, dicalcium silicate and minor amounts of calcium titanate) is then leached. The leach liquor may consist of water or an aqueous solution of caustic soda and/or soda ash. Since the process of this invention is best operated as a cyclic process, the preferred leaching agent is a recycled sodium aluminate-containing liquor from the subsequent precipitation of aluminum hydroxide from pregnant sodium aluminate solutions. The preferred recycle process for the leach liquors of this process will best be understood by the description to be found in the examples given below.

The leached product, consisting of a solution of sodium aluminate and a slurry of dicalcium silicate and calcium titanate is then thickened by conventional means and filtered. The insoluble residue of dicalcium silicate and calcium titanate is discarded. The filtrate, consisting of a sodium aluminate solution, is then processed by any of the conventional methods now known to the art, for the recovery of a suitable grade of alumina, and a soda ash liquor for recycling to the process.

Since minor amounts of silica are converted to a sodium aluminosilicate and extracted with the sodium aluminate liquor, the $NaAlO_2$ filtrate is preferably first submitted to a conventional desilication process. Desilication is best effected by digestion of the sodium aluminate solution under pressure which causes precipitation of the sodium aluminum silicate contained therein (French Patent 339,049 (1904), British Patent 19,924 (1904), German Patent 197,881 (1908), U.S. Patent 1,422,004 (1922), U.S. Patent 938,432 (1909), U.S. Patent 1,137,860 (1915)), or may be effected by any of the desilication technics well known to the art.

The desilicated sodium aluminate liquors may then be treated, as is conventionally done in the Bayer process, by "seeding" with a recycled charge of "seed alumina" (which is aluminum hydroxide from a previous charge) in amounts equivalent to 25% to 100% of the $Al(OH)_3$ contained in the sodium aluminate liquors, and the mixture is stirred approximately 45 hours by a submerged airlift. During this period, 50% to 60% of the $Al(OH)_3$ in the sodium aluminate is precipitated. Various methods of particle-size control may be employed in this precipitation. Low temperature precipitation and high $Al(OH)_3$ concentration in the solution, or large amounts of small particle size "seed alumina" will reduce the particle size of the precipitated product.

The precipitated $Al(OH)_3$ is filtered off and washed free of soda with water. The washed $Al(OH)_3$ is filtered and calcined by conventional means to give an aluminum oxide, of suitable purity for use in the electrolytic manufacture of aluminum.

The filtrate from the aluminum hydroxide precipitate (which contains unprecipitated alumina in the form of a sodium aluminate solution) may then be treated with carbon dioxide, e.g. by carbonation with a filtered flue gas. The carbonation will precipitate all of the remaining $Al(OH)_3$ in the sodium aluminate liquor, and will regenerate the sodium carbonate solution required in the preparation of the furnace charge. Thus, after carbonation (e.g. with flue gas), the reaction mixture is thickened. The $Al(OH)_3$ precipitate containing some sodium aluminate is returned to the desilication step where it is combined with the leached sodium aluminate liquors, submitted to desilication and returned to the recycle stream. The solution of sodium carbonate is returned to the first step of the process to prepare the furnace charge for the next batch of the ore.

This process of invention may best be understood by giving a number of examples of the operation thereof. The following examples are given to define and illustrate this invention, but in no ways to limit it to reagents, proportions or conditions described therein. Obvious improvements and modifications will occur to any person skilled in the art.

In all of the following examples, a ferruginous bauxite ore obtained from Kauai, in the Hawaiian Islands, was employed. This ore, used directly as mined, without beneficiation or upgrading, analyzes: $Al_2O_3$ (total)—31.12%, $Fe_2O_3$—34.88%, $SiO_2$—9.11%, $TiO_2$—5.11% and loss on ignition—18.20%. The limestone used analyzed 97.8% $CaCO_3$ and 1.2% $SiO_2$ and had an "effective" $CaCO_3$ content of 93.8%. The coke used was an ordinary bituminous coke analyzing 89% carbon and 4.2% $SiO_2$. The fuel oil used contained 0.58% sulfur.

EXAMPLE I

The ferruginous aluminum ore is intimately mixed with powdered limestone, with soda ash and with powdered coke. The mass is then sintered in an electric furnace for varying periods of time and at different temperatures. At the conclusion of the sintering, the mass is cooled, ground with water in a ball mill and the disintegrated sinter is magnetically extracted. The residual sinter is then leached with an excess of 5% NaOH solution and the filtered sodium aluminate leachate is then carbonated with $CO_2$ until $Al(OH)_3$ precipitation is complete. The $Al(OH)_3$ is filtered off, washed with water until free of alkali, and calcined to $Al_2O_3$.

The first reagent to be varied is the calcium carbonate. This is varied in 0.2 mole stages from 1.0 to 2.0 moles per mole of total $SiO_2$ in the ore and the coke, then in 0.05 mole stages from 2.0 to 2.2 moles per mole of total $SiO_2$, and then in 0.2 mole stages from 2.2 to 3.0 moles per mole of effective $CaCO_3$. In all cases, 1.0 mole of effective $CaCO_3$ is used per mole of $TiO_2$ in the ore. In these experiments, the soda ash is used in an amount of 1.0 mole per 1.0 mole of $Al_2O_3$ in the ore. The coke was used in an amount of 25% on the weight of the ore. The sinter temperature was maintained at 1000°–1100° C., and the sinter duration at this temperature was one hour. The following yields were obtained:

| Moles of $CaCO_3$ per mole of $SiO_2$ in Charge | Alumina Recovery, percent | Magnetic Iron Fraction, percent |
| --- | --- | --- |
| 1.00 | 32.6 | 68.4 |
| 1.20 | 37.6 | 70.2 |
| 1.40 | 41.8 | 74.6 |
| 1.60 | 52.2 | 78.8 |
| 1.80 | 60.6 | 81.2 |
| 2.00 | 78.8 | 88.4 |
| 2.05 | 81.1 | 86.4 |
| 2.10 | 81.1 | 80.5 |
| 2.15 | 79.6 | 85.8 |
| 2.20 | 74.0 | 86.2 |
| 2.40 | 71.8 | 83.7 |
| 2.60 | 66.0 | 84.0 |
| 2.80 | 50.0 | 83.1 |
| 3.00 | 44.8 | 85.1 |

Thus, it will be noted that from 2.00 to 2.15 moles of effective $CaCO_3$ per 1.0 mole of total $SiO_2$ in the charge gives maximum alumina recovery coupled with maximum recovery of the magnetic iron fraction.

The second variable changed is the soda ash. Maintaining the $CaCO_3/SiO_2$ ratio at 2.00, the coke at 25% on the weight of the ore, the temperature at 1000° to 1100° C. and the sinter duration at this temperature for one hour, the soda ash was varied in stages of 0.10 mole from 0.5 to 1.0 mole per mole of $Al_2O_3$ in the ore, then in stages of 0.05 mole from 1.00 to 1.20 mole per mole of $Al_2O_3$ in the ore, then in stages of 0.10 mole from 1.20 to 1.50 mole per mole of $Al_2O_3$ in the ore. The yields obtained were:

| Moles of $Na_2CO_3$ per mole of $Al_2O_3$ | Alumina Recovery, percent | Magnetic Iron Fraction, percent |
| --- | --- | --- |
| 0.50 | 36.4 | 64.6 |
| 0.60 | 40.2 | 74.2 |
| 0.70 | 44.6 | 78.2 |
| 0.80 | 56.2 | 80.4 |
| 0.90 | 67.4 | 81.1 |
| 1.00 | 75.2 | 81.2 |
| 1.05 | 81.0 | 83.7 |
| 1.10 | 84.2 | 79.0 |
| 1.15 | 83.1 | 85.5 |
| 1.20 | 82.8 | 88.2 |
| 1.30 | 83.9 | 79.2 |
| 1.40 | 82.0 | 80.2 |
| 1.50 | 83.1 | 78.8 |

Maximum alumina recovery was therefore obtained with a ratio of 1.05 to 1.15 mole of $Na_2CO_3$ per mole of $Al_2O_3$ in the ore, coupled with maximum recovery of the magnetic iron fraction.

The third variable changed was the coke added to the charge. The $CaCO_3/SiO_2$ ratio was maintained at 2.00, the soda ash/alumina ratio was maintained at 1.10, the temperature was maintained at 1100°–1200° C. and the duration of the sinter was maintained at one hour. The results obtained were as follows, varying the coke in 5% increments (on the weight of the charge) between 5% and 25%. The following results were obtained:

| Weight of Coke in Charge, percent | Alumina Recovery, percent | Iron Recovery, percent |
| --- | --- | --- |
| 5 | 78.2 | 42.6 |
| 10 | 80.2 | 78.2 |
| 15 | 81.1 | 79.2 |
| 20 | 82.2 | 80.4 |
| 25 | 80.5 | 78.8 |

Thus, 10% to 15% of coke on the weight of the charge seems to give the maximum iron recovery (within the limits of experimental error) and no advantage is derived by the use of more than twenty percent.

The fourth variable was the furnace temperature. The $CaCO_3/SiO_2$ ratio was maintained at 2.00, the soda ash/alumina ratio was maintained at 1.10, the coke was added to the extent of 15% of the charge, the reaction mixture was kept at the sinter temperature for one hour, and the following results were obtained:

| Reaction temperature, ° C. | Alumina Recovery, percent | Iron Recovery, percent |
| --- | --- | --- |
| 700–800 | 44.8 | 21.9 |
| 800–900 | 69.5 | 61.2 |
| 900–1,000 | 78.6 | 81.2 |
| 1,000–1,100 | 81.4 | 82.2 |
| 1,100–1,200 | 78.8 | 80.3 |
| 1,200–1,300 | 66.2 | 81.4 |
| 1,300–1,400 | 62.7 | 80.2 |

At temperatures above 1200° C., considerable fuming was observed. The fumes condensed on a cold surface and, when scraped off from the surface, these proved to be soda ash. There seems to be excessive volatilization of the soda ash above 1200° C. In addition, the sinter on cooling gives evidence of having melted partially and resolidified on cooling. The fusing of the sinter in the kiln can cause serious problems, so that, for all practical purposes, we can consider the optimum sinter temperature at between 800° C. and 1200° C. and preferably between 1000° C. and 1100° C.

The final variable was the residence period within the sintering temperature range of 1000° to 1100° C.

| Sintering period at 1,000°–1,100° C. | Alumina Recovery, percent | Magnetic Iron Recovery, percent |
| --- | --- | --- |
| 10 minutes | 68.4 | 52.8 |
| 20 minutes | 78.8 | 76.2 |
| 40 minutes | 81.2 | 80.5 |
| 60 minutes | 78.9 | 81.2 |
| 80 minutes | 80.5 | 84.4 |

Thus, a reaction period of 20 to 60 minutes at a temperature of 1000°–1100° C. gives optimum alumina and magnetic iron recovery.

It must be stressed however, that the amount of carbon-containing material, the reaction temperature and the duration of the sinter may vary considerably and may depend to a considerable extent on the design, operation and efficiency of the furnace or the rotary kiln.

On the basis of these experiments, the optimum reagent proportions and reaction conditions have been determined as follows:

$CaSO_3SiO_2$ ratio in charge—2.00 to 2.15
$Na_2CO_3/Ol_2O_3$ ratio in charge—1.05 to 1.15
$CaCO_3/TiO_2$ ratio in charge—1.00
Sinter temperature—900° C. to 1100° C.
Sinter time—20 to 60 minutes
Coke—10% to 20% on the weight of the charge

EXAMPLE II

A furnace feed was prepared containing 250 gms. of Hawaiian ore (equivalent to 77.8 gms. $Al_2O_3$, 87.2 gms. $Fe_2O_3$ and 22.8 gms. $SiO_2$), 109 gms. powdered limestone (93.8% "effective" $CaCO_3$ content), 90 gms. of soda ash and 67 gms. of powdered coke (4.2% $SiO_2$). Total weight of feed mix—516 gms. This was packed in a crucible, heated to 1000° C. and maintained at a temperature of 1000°–1100° C. for one hour, then cooled.

The calcine after cooling weighed 331 gms., i.e. a weight loss on calcination of 185 gms. This calcine was finely ground in a steel-ball mill, the ground calcine was mixed with 350 cc. of water, the slurry was spread on trays and extracted magnetically. The weight of the recovered magnetic extract was 50.4 gms. The magnetic extract was washed with water and dried. The slurry of the calcine (after the iron extraction) was then combined with the washings of the iron extract, and was then extracted with a 5% soda ash solution.

This extraction was effected by mixing the calcine slurry with 500 cc. of 5% soda ash solution, shaken for an hour, then filtered. The wet filtercake was then mixed with another 500 cc. of 5% soda ash solution, shaken for an hour, then filtered. This was repeated for a total of four extractions. The last filtercake was washed with a total of 750 cc. of hot water until the washwater is neutral to litmus. The combined filtrate and washings were carbonated with $CO_2$ gas until no more $CO_2$ is absorbed, cooled to room temperature, the precipitated $Al(OH)_3$ filtered off and washed on the filter with 250 cc. of hot water. The $Al(OH)_3$ was then calcined and converted to alumina by conventional means.

The combined filtrate and washings (about 3270 cc.) were then concentrated to a total volume of 1000 cc. and the sodium carbonate in this solution determined analytically.

The yield of alumina from a 250 gm. charge of Hawaiian ore was 62.8 gms. (equivalent to an 81% recovery) and 50.4 gms. of a magnetic iron fraction assaying 91.6% metallic iron (equivalent to a 76% recovery of iron). The total soda ash recovery in the filtrate and washings was 183.41 gms. Deducting the 100.0 gms. of soda ash used in the preparation of the leaching liquors, the actual soda ash recovery was 83.41 gms. (92.6% of the original charge) and the loss per cycle was 6.59 gms.

EXAMPLE III

The procedure described in Example II was repeated, with varying amounts of a petroleum fraction (#6 fuel oil) and comminuted bagasse used in place of the coke, as the carbon-containing reducing agent. The yields of alumina and the magnetic iron fraction obtained were as follows:

| Percent of reducing agent (on the weight of the furnace feed) | Alumina Yield, percent | Magnetic Iron Fraction Yield, percent |
| --- | --- | --- |
| Fuel Oil: | | |
| 5% | 70.4 | 62.0 |
| 10% | 82.6 | 79.0 |
| 15% | 81.2 | 79.7 |
| 20% | 84.7 | 81.1 |
| 25% | 83.5 | 82.2 |
| Bagasse: | | |
| 5% | 80.6 | 52.6 |
| 10% | 82.5 | 68.7 |
| 15% | 79.0 | 80.6 |
| 20% | 82.0 | 81.4 |
| 25% | 81.4 | 83.5 |

EXAMPLE IV

The process of my invention is most efficiently operated as a cyclic process in which the soda ash and other intermediate values are recovered and continually recycled. This cyclic process may best be understood by reference to the drawing of the flow-sheet diagram appended to this specification, and to the appended "Table of compositions of process flow-sheet reagents." The numerals in the flow-sheet refer to the corresponding columns in the "Table of compositions." Each column details the composition of the kiln feed, process reagents, recycling liquors and end-products of the process at each stage thereof. The figures given are on the basis of a continuous operation yielding 1000 tons of alumina product per 24 hour working day.

5110.0 tons of the Hawaiian ferruginous aluminum ore (composition in column 1), 1130.0 tons of ground coke (column 2), 156.1 tons of soda ash (as make-up for losses in each cycle) (column 3) and 1928.5 tons of ground limestone (column 4) are slurried with 4903.3 tons of soda ash solution recycled from the sodium aluminate carbonater (column 6) and 178.9 tons of recycled desilication residue from the desilication step (column 5).

The total kiln feed—13,406.8 tons—(column 7) was fed continuously to the rotary kiln, for a total residence period of 30 to 60 minutes, at a kiln temperature of 1000°–1100° C. The rotary kiln is fired with gas or fuel oil and a reducing atmosphere is maintained. The composition of the kiln gases, other than the products of combustion, are given in column 8.

The calcined product (column 9)—5104.6 tons—was mixed with 3958.4 tons of recycle sodium aluminate liquor (column 11) from the filtration of the magnetic iron fraction and with 10,558.1 tons of recycle sodium aluminate liquor (column 12) from the thickener of the calcine leach, and was comminuted in a ball mill. The slurry from the ball mill—19,619.1 tons—(column 13) was submitted to magnetic separation. The extracted slurry—16,179.8 tons—(column 14) was passed to the thickener. The magnetic iron extract—3439.3 tons—(column 15) is filtered and washed on the filterpress with 1506.1 tons of water (column 16). The filtrate and washings—3958.4 tons (column 11) is returned to the ball mill. The filtercake of magnetic iron extract—987.0 tons (column 17) is dried in a kiln, where 153.3 tons of water (column 24) is driven off and 833.7 tons of magnetic iron fraction (column 21) is recovered.

The extracted slurry (column 14) is combined in the thickener with 1204.2 tons of recycle sodium aluminate liquor from the aluminum hydroxide precipitate (column 19), with 791.9 tons of recycle sodium aluminate liquor from the washings of the $Al(OH)_3$ precipitate (column 20), and with the washings of the thickener mud residue—9878.0 tons (column 22). The insoluble residue, consisting of dicalcium silicate and calcium titanate from the thickener is filtered, washed with water (column 22), the washings recycled to the thickener, and the "mud"—4561.6 tons—composition given in column 23—is discarded.

Part of the sodium aluminate liquor from the thickener—10,558.1 tons—(column 12) is recycled to the ball mill. The remainder of the sodium aluminate liquor—12,934.2 tons (column 18) is sent to the desilicator. This is combined with 8649.6 tons of sodium aluminate liquors (column 10) recycled from the $Al(OH)_3$ precipitation, and with 1379.4 tons of sodium aluminate-aluminum hydroxide residues the thickener of the soda ash regeneration (column 25). After conventional desilication, the precipitated sodium aluminum silicate is filtered off. The filtercake—178.9 tons—(column 5) is recycled to the kiln feed charge. The filtrate of sodium aluminate solution—22,784.3 tons (column 26) is passed to the aluminum hydroxide precipitator, mixed with "seed alumina" and treated by conventional means to obtain an $Al(OH)_3$ precipitate of desired fineness. During this precipitation, about 1000.0 tons of water (column 27) are lost by evaporation. The precipitated aluminum hydroxide is filtered, washed on the filterpress with 766.8 tons of water (column 33). The filtrate and washings—791.9 tons (column 20) are recycled to the calcine leach slurry thickener. The washed precipitate—1814.5 tons (column 34) is passed to a kiln, calcined by conventional means, whereby 814.5 tons of water are removed (column 35) and 1000.0 tons of alumina are obtained (column 36).

The filtrate from the aluminum hydroxide precipitation, comprising a sodium aluminate liquor of composition given in column 28, is divided into two portions. One portion is evaporated to remove 4000.0 tons of water (column 30) and salt out 306.8 tons of a sodium sulfate-containing residue (column 29). The sodium sulfate is formed during the calcination from the minor amounts of sulfur introduced into the recycling liquors by the ore and the coke. The filtrate from the salting out of the sodium sulfate—5784.0 tons—(column 31) combined with the remainder of the sodium aluminate liquor (column 28) is passed to the carbonation vessel.

The combined liquors are carbonated with flue gas containing a total of 498.7 tons of carbon dioxide (column 32). Precipitated $Al(OH)_3$ is passed to a thickener, and the thickened product—$Al(OH)_3$ containing some sodium aluminate—1379.4 tons (column 25) is returned to the desilication step. The filtrate from the thickener— 4903.3 tons of soda ash solution (column 6) is recycled to the prepartion of the calcination feed mixture.

A materials balance of the process indicates that 5110.0 tons of the Hawaiian ferruginous aluminum ore, 1130.0 tons of coke, 156.1 tons of makeup soda ash per charge, 1928.5 tons of limestone and 498.7 tons of carbon dioxide from flue or kiln gases, will yield 1000.0 tons of alumina and 833.7 tons of a magnetic iron fraction of composition given in column 21.

The alumina obtained analyzes to contain about 0.022% $SiO_2$, 0.019% $Fe_2O_3$, 0.001% $TiO_2$ and 0.442% $Na_2O$, and is entirely suitable for use in the electrolytic manufacture of metallic aluminum.

The magnetic iron fraction analyzes to contain 0.033% of sulfur and 0.038% of phosphorus.

Table of compositions of process flow-sheet reagents

[Basis—1,000 tons alumina product per day. All figures in tons per day]

|  | (1) | (2) | (3) | (4) | (5) |
|---|---|---|---|---|---|
| $Na_2O$ |  |  | 91.3 |  | 25.6 |
| $Al_2O_3$ | 1,242.8 |  |  |  | 37.3 |
| $SiO_2$ | 396.5 | 39.2 |  | 19.5 | 33.7 |
| Fe |  |  |  |  |  |
| $Fe_2O_3$ | 1,467.6 |  |  |  |  |
| $CO_2$ |  |  | 64.8 | 830.0 | 0.3 |
| $TiO_2$ | 208.5 |  |  |  |  |
| $H_2O$ | a 1,782.4 |  |  |  | 81.8 |
| $Na_2SO_4$ |  |  |  |  | 0.2 |
| Other | b 12.2 | c 1,090.8 |  | 19.5 |  |
| CaO |  |  |  | 1,059.5 |  |
| Total | 5,110.0 | 1,130.0 | 156.1 | 1,928.5 | 178.9 |

|  | (6) | (7) | (8) | (9) | (10) |
|---|---|---|---|---|---|
| $Na_2O$ | 740.1 | 857.0 | 4.3 | 817.7 | 751.9 |
| $Al_2O_3$ |  | 1,280.1 |  | 1,280.1 | 365.0 |
| $SiO_2$ |  | 488.9 |  | 488.9 |  |
| Fe |  |  |  | 720.5 |  |
| $Fe_2O_3$ |  | 1,467.6 |  | 439.5 |  |
| $CO_2$ | 525.0 | 1,420.1 | 5,000.0+ |  | 26.7 |
| $TiO_2$ |  | 208.5 |  | 208.5 |  |
| $H_2O$ | 3,630.7 | 5,494.9 | 5,494.9 |  | 7,430.0 |
| $Na_2SO_4$ | 7.5 | 7.7 |  | 87.9 | 76.0 |
| Other |  | 1,122.5 |  |  |  |
| CaO |  | 1,059.5 |  | 1,059.5 |  |
| Total | 4,903.3 | 13,406.8 | 10,499.2+ | 5,104.6 | 8,649.6 |

|  | (11) | (12) | (13) | (14) | (15) |
|---|---|---|---|---|---|
| $Na_2O$ | 283.9 | 720.0 | 1,821.6 | 1,533.6 | 288.0 |
| $Al_2O_3$ | 395.4 | 876.0 | 2,551.5 | 2,149.5 | 402.0 |
| $SiO_2$ |  | 26.4 | 515.3 | 515.3 |  |
| Fe |  |  | 720.5 | 144.6 | 575.9 |
| $Fe_2O_3$ |  |  | 439.5 | 192.7 | 246.8 |
| $CO_2$ | 9.2 | 25.6 | 34.8 | 29.3 | 5.5 |
| $TiO_2$ |  |  | 208.5 | 208.5 |  |
| $H_2O$ | 3,266.9 | 8,830.0 | 12,096.9 | 10,179.0 | 1,917.9 |
| $Na_2SO_4$ | 3.0 | 80.1 | 171.0 | 167.8 | 3.2 |
| Other |  |  |  |  |  |
| CaO |  |  | 1,059.5 | 1,059.5 |  |
| Total | 3,958.4 | 10,558.1 | 19,619.1 | 16,179.8 | 3,439.3 |

|  | (16) | (17) | (18) | (19) | (20) |
|---|---|---|---|---|---|
| $Na_2O$ |  | 4.1 | 900.5 | 104.3 | 19.9 |
| $Al_2O_3$ |  | 6.6 | 1,099.4 | 50.7 | 2.6 |
| $SiO_2$ |  |  | 33.7 |  |  |
| Fe |  | 575.9 |  |  |  |
| $Fe_2O_3$ |  | 246.8 |  |  |  |
| $CO_2$ | 3.8 | 0.1 | 31.3 | 3.7 | 2.3 |
| $TiO_2$ |  |  |  |  |  |
| $H_2O$ | 1,502.3 | 153.3 | 10,769.5 | 1,035.0 | 765.0 |
| $Na_2SO_4$ |  | 0.2 | 99.8 | 10.5 | 2.1 |
| Other |  |  |  |  |  |
| CaO |  |  |  |  |  |
| Total | 1,506.1 | 987.0 | 12,934.2 | 1,204.2 | 791.9 |

|  | (21) | (22) | (23) | (24) | (25) |
|---|---|---|---|---|---|
| $Na_2O$ | 4.1 |  | 37.3 |  | 129.3 |
| $Al_2O_3$ | 6.6 |  | 227.4 |  | 424.8 |
| $SiO_2$ |  |  | 455.2 |  |  |
| Fe | 575.9 |  | 144.6 |  |  |
| $Fe_2O_3$ | 246.8 |  | 192.7 |  |  |
| $CO_2$ | 0.1 | 22.9 | 1.3 |  | 4.6 |
| $TiO_2$ |  |  | 208.5 |  |  |
| $H_2O$ |  | 9,855.1 | 2,234.6 | 153.3 | 819.3 |
| $Na_2SO_4$ | 0.2 |  | 0.5 |  | 1.4 |
| Other |  |  |  |  |  |
| CaO |  |  | 1,059.5 |  |  |
| Total | 833.7 | 9,878.0 | 4,561.6 | 153.3 | 1,379.4 |

|  | (26) | (27) | (28) | (29) | (30) |
|---|---|---|---|---|---|
| $Na_2O$ | 1,756.1 |  | 875.0 | 5.6 |  |
| $Al_2O_3$ | 1,851.9 |  | 426.3 | 1.5 |  |
| $SiO_2$ |  |  |  |  |  |
| Fe |  |  |  |  |  |
| $Fe_2O_3$ |  |  |  |  |  |
| $CO_2$ | 62.3 |  | 31.1 | 0.2 |  |
| $TiO_2$ |  |  |  |  |  |
| $H_2O$ | 18,937.0 | 1,000.0 | 8,670.0 | 220.0 | 4,000.0 |
| $Na_2SO_4$ | 177.0 |  | 88.4 | 79.5 |  |
| Other |  |  |  |  |  |
| CaO |  |  |  |  |  |
| Total | 22,784.3 | 1,000.0 | 10,090.8 | 306.8 | 4,000.0 |

|  | (31) | (32) | (33) |
|---|---|---|---|
| $Na_2O$ | 869.4 |  |  |
| $Al_2O_3$ | 424.8 |  |  |
| $SiO_2$ |  |  |  |
| Fe |  |  |  |
| $Fe_2O_3$ |  |  |  |
| $CO_2$ | 30.9 | 498.7 | 1.8 |
| $TiO_2$ |  |  |  |
| $H_2O$ | 4,450.0 |  | 765.0 |
| $Na_2SO_4$ | 8.9 |  |  |
| Other |  |  |  |
| CaO |  |  |  |
| Total | 5,784.0 | 498.7 | 766.8 |

|  | (34) | (35) | (36) |
|---|---|---|---|
| $Na_2O$ |  | 5.0 | 5.0 |
| $Al_2O_3$ |  | 1,007.3 | 12.3 | 995.0 |
| $SiO_2$ |  |  |  |
| Fe |  |  |  |
| $Fe_2O_3$ |  |  |  |
| $CO_2$ |  | 0.2 | 0.2 |
| $TiO_2$ |  |  |  |
| $H_2O$ |  | 802.0 | 802.0 |
| $Na_2SO_4$ |  |  |  |
| Other |  |  |  |
| CaO |  |  |  |
| Total |  | 1,814.5 | 814.5 | 1,000.0 | a 760.4 is bound water.   b 10.2 is sulfur.   c 7.8 is sulfur.

Having described my invention, what I claim and desire to protect by Letters Patent is:

1. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture and with a carbon-containing reducing material in quantity at least sufficient to reduce a substantial part of the iron oxides in said mixture, to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

2. A process for the simultaneous recovery of alumina and metallic iron from ferruginous aluminum ores containing alumina, silica and iron oxides which comprises the steps of:

(a) Admixing the ore with from 1.00 to 1.15 moles of sodium carbonate for each mole of alumina in the mixture to form sodium aluminate, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

3. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with from 2.00 to 2.15 moles of effective calcium carbonate for each mole of silica in the mixture to form dicalcium silicate, and with a carbon-containing reducing material in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

4. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with 1.00 mole of effective calcium carbonate for each mole of titania in said mixture and additional calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

5. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with limestone in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

6. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with coke in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

7. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with coal in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

8. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with a petroleum fraction in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

9. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with fuel oil in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

10. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with bagasse in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

11. A process for the simultaneous recovery of alumina and metallic iron from ferruginous aluminum ores containing alumina, silica and iron oxides which comprises the steps of:

(a) Admixing the ore as a dry mixture with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

12. A process for the simultaneous recovery of alumina and metallic iron from ferruginous aluminum ores containing alumina, silica and iron oxides which comprises the steps of:

(a) Admixing the ore as an aqueous slurry with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

13. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture in a rotary kiln within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

14. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 1000° C. to 1100° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

15. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture in a reducing atmosphere within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

16. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity from 5% to 25% by weight of the mixture to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

17. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 800° C. to 1200° C. and for a period of from 10 to 80 minutes to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium and thereafter separating the aqueous solution of sodium aluminate thus obtained from the insoluble residue containing dicalcium silicate.

18. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous sodium aluminate solution and thereafter separating the aqueous solution of sodium aluminate thus obtained from the insoluble residue containing dicalcium silicate.

19. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium, separating the aqueous solution of sodium aluminate thus obtained from the insoluble residue containing dicalcium silicate, reacting said solution with carbon dioxide to precipitate aluminum hydroxide and form sodium carbonate, separating the aluminum hydroxide, and recycling the sodium carbonate solution to provide at least part of the sodium carbonate required for the preparation of the calcination feed mixture.

20. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium, separating the aqueous solution of sodium aluminate thus obtained from the insoluble residue containing dicalcium silicate, seeding said separated solution with aluminum hydroxide whereby an additional quantity of aluminum hydroxide is precipitated and separated from the reaction mixture, and recycling the separated solution of sodium aluminate to the process.

21. A process for the simultaneous recovery of alumina and metallic iron from ferruginous aluminum ores containing alumina, silica and iron oxides which comprises the steps of:

(a) Admixing the ore with sodium carbonate, in quantity at least sufficient to form sodium aluminate on reaction with the alumina in said mixture, with calcium carbonate in quantity at least sufficient to form dicalcium silicate on reaction with the silica in said mixture, and with a carbon-containing reducing material in quantity at least sufficient to reduce a substantial part of the iron oxides in said mixture to metallic iron;

(b) Calcining said mixture within a temperature range of from 800° C. to 1200° C. and for a period of time sufficient to effect formation of sodium aluminate, dicalcium silicate and metallic iron;

(c) Comminuting said calcined mixture and magnetically separating the metallic iron contained therein;

(d) Leaching the calcined mixture after said iron separation with an aqueous medium, separating the aqueous solution of sodium aluminate thus obtained from the insoluble residue containing dicalcium silicate, seeding said separated solution with aluminum hydroxide whereby an additional quantity of aluminum hydroxide is precipitated and separated from the reaction mixture, reacting the separated solution with carbon dioxide to precipitate a further quantity of aluminum hydroxide and form sodium carbonate, separating said aluminum hydroxide from the sodium carbonate solution, and recycling the latter to the first step of the process to provide at least part of the sodium carbonate required for the preparation of the calcination feed mixture.

References Cited in the file of this patent

UNITED STATES PATENTS

| | | |
|---|---|---|
| 1,262,062 | Lawrie | Apr. 9, 1918 |
| 1,926,744 | James | Sept. 12, 1933 |
| 2,587,328 | Johnson | Feb. 26, 1952 |
| 2,657,978 | Johnson | Nov. 3, 1953 |
| 2,707,669 | Houston | May 3, 1955 |
| 2,792,298 | Freeman | May 14, 1957 |
| 2,830,892 | Udy | Apr. 15, 1958 |

OTHER REFERENCES

"Lime-Soda . . . Tests," U.S. Dept. of Interior, Report of Investigations, No. R.I. 4462, June 1949, by Conley, J. E., et al., pages 6 to 23 and Fig. 1 opposite page 4.